(12) United States Patent
Feng et al.

(10) Patent No.: US 11,405,885 B2
(45) Date of Patent: Aug. 2, 2022

(54) METHODS AND APPARATUS FOR WIRELESS DEVICE COMMUNICATION

(71) Applicant: TELEFONAKTIEBOLAGET LM ERICSSON (PUBL), Stockholm (SE)

(72) Inventors: Jinhua Feng, Bromma (SE); Beatriz Grafulla-González, Solna (SE); Ao Song, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/954,559

(22) PCT Filed: Dec. 18, 2017

(86) PCT No.: PCT/SE2017/051289
§ 371 (c)(1),
(2) Date: Jun. 17, 2020

(87) PCT Pub. No.: WO2019/125235
PCT Pub. Date: Jun. 27, 2019

(65) Prior Publication Data
US 2020/0337018 A1 Oct. 22, 2020

(51) Int. Cl.
*H04W 64/00* (2009.01)
*H04W 76/50* (2018.01)
(Continued)

(52) U.S. Cl.
CPC ......... *H04W 64/003* (2013.01); *H04W 4/023* (2013.01); *H04W 4/40* (2018.02);
(Continued)

(58) Field of Classification Search
CPC ......... H04W 4/40; H04W 4/80; H04W 4/023; H04W 64/003; H04W 76/50; H04W 8/005
(Continued)

(56) References Cited

U.S. PATENT DOCUMENTS 8,908,573 B1 * 12/2014 Wang ................ H04L 1/0003
370/280
9,274,529 B2    3/2016 Ben-Shachar et al.
(Continued)

FOREIGN PATENT DOCUMENTS

GB           2488897 A        9/2012

OTHER PUBLICATIONS

International Search Report/Written Opinion in related/corresponding PCT Application No. PCT/SE2017/051289 dated Oct. 16, 2018.

(Continued)

*Primary Examiner* — William Nealon
(74) *Attorney, Agent, or Firm* — Patent Portfolio Builders PLLC

(57) ABSTRACT

According to embodiments described herein there is provided methods and apparatus for providing communications to a wireless device using device-to-device communication with an unmanned vehicle. A method in a wireless device comprises establishing a device-to-device, D2D, wireless connection to the unmanned vehicle; and responsive to receiving an operation command over the D2D wireless connection, performing an operation. A method in an unmanned vehicle comprises determining a current location of a wireless device; travelling to within a wireless range of the current location of the wireless device; establishing a device-to-device, D2D, wireless connection with the wireless device; and transmitting an operation command to the wireless device over the D2D wireless connection to instruct the wireless device to perform an operation.

19 Claims, 12 Drawing Sheets

(51) Int. Cl.
*H04W 4/80* (2018.01)
*H04W 4/40* (2018.01)
*H04W 4/02* (2018.01)
*H04W 8/00* (2009.01)

(52) U.S. Cl.
CPC ............. *H04W 4/80* (2018.02); *H04W 8/005* (2013.01); *H04W 76/50* (2018.02)

(58) Field of Classification Search
USPC ........................................................ 370/329
See application file for complete search history.

(56) References Cited

U.S. PATENT DOCUMENTS

| | | | |
|---|---|---|---|
| 2008/0049777 A1* | 2/2008 | Morrill | H04L 67/141 370/420 |
| 2009/0013210 A1 | 1/2009 | McIntosh et al. | |
| 2012/0221175 A1* | 8/2012 | Spinelli | G01S 19/13 701/2 |
| 2015/0365792 A1 | 12/2015 | Manges | |
| 2016/0140851 A1* | 5/2016 | Levy | G08G 5/045 701/3 |
| 2016/0225264 A1* | 8/2016 | Taveira | G08G 5/0013 |
| 2016/0363929 A1* | 12/2016 | Clark | B64F 1/00 |
| 2017/0029107 A1* | 2/2017 | Emami | G08G 5/0069 |
| 2018/0026708 A1* | 1/2018 | Priest | H04W 4/40 370/316 |

OTHER PUBLICATIONS

Milan Erdelj et al., "Wireless Sensor Networks and Multi-UAV systems for natural disaster management," Computer Networks, Elsevier, Jun. 2017, pp. 72-85, vol. 124.

Riham Altawy et al., "Security, Privacy, and Safety Aspects of Civilian Drones," ACM Transactions on Cyber Physical Systems, Nov. 2016, pp. 1-25, vol. 1, No. 2, article 7.

Specification of the Bluetooth System, Master Table of Contents and Compliance Requirements, Covered Core Package Version: 5.0, Dec. 6, 2016, https://www.bluetooth.org/en-us/specification/adopted-specifications, pp. 1-2822.

* cited by examiner

METHODS AND APPARATUS FOR WIRELESS DEVICE COMMUNICATION

TECHNICAL FIELD

Embodiments disclosed herein relate to methods and apparatus for providing device-to-device communication between a wireless device and an unmanned vehicle in order to allow the wireless device to perform an operation which it may otherwise be unable to perform.

BACKGROUND

Unmanned vehicles for example, drones, are being widely used for civil and military operations. In some cases, unmanned vehicles may be required to travel to areas far away from the operation centre. For example, a drone may be required to perform oil pipe inspection in the desert. In these remote operations, the unmanned vehicle may travel autonomously from the operation centre to the destination, which is typically beyond visual line of sight (BVLOS). The connection between the unmanned vehicle and the operation centre may be via a wireless communications network.

In principle, a properly functioning unmanned vehicle will be able to complete these remote operations. However, in circumstances where something goes wrong, for example, a positioning system signal is lost, a data connection is lost (when the modem stops working or there is no network coverage), there is an engine failure, or the battery level is low, the unmanned vehicle may be forced to halt somewhere to avoid damage or eventual crash. In these circumstances, the unmanned vehicle may be completely lost or may wait to be found by the operator of the unmanned vehicle who would be required to figure out how to efficiently locate and rescue it.

If the unmanned vehicle is lost, there is a loss for the operator of the unmanned vehicle in terms of investment, business, time, etc. It is therefore advantageous to find the lost unmanned vehicle. However, in circumstances where the unmanned vehicle loses a wireless functionality, for example either a positioning system or a data connection to the wireless communications network, then it is either unaware of its location, or unable to communicate its location in order to be rescued. A human team may therefore be required to search for the unmanned vehicle. However, this may be very costly and inefficient in time and resources since the location of the unmanned vehicle is not exactly known. Furthermore, some locations may be difficult to access, and may therefore be dangerous for a human team to search.

SUMMARY

According to embodiments described herein there is therefore provided a method, in a wireless device. The method comprises establishing a device-to-device, D2D, wireless connection to the unmanned vehicle; and responsive to receiving an operation command over the D2D wireless connection, performing an operation.

There is also provided a wireless device. The wireless device comprises an interface; and a processor, wherein the processor is operable to establish a device-to-device, D2D, wireless connection to the unmanned vehicle; and responsive to receiving an operation command over the D2D wireless connection, perform an operation.

There is also provided a method, in an unmanned vehicle. The method comprises determining a current location of a wireless device; travelling to within a wireless range of the current location of the wireless device; establishing a device-to-device, D2D, wireless connection with the wireless device; and transmitting an operation command to the wireless device over the D2D wireless connection to instruct the wireless device to perform an operation.

There is also provided an unmanned vehicle. The unmanned vehicle comprises an interface; and a processor, wherein the processor is operable to determine a current location of a wireless device; cause the unmanned vehicle to travel to within a wireless range of the current location of the wireless device; establish a device-to-device, D2D, wireless connection with the wireless device; and transmit an operation command to the wireless device over the D2D wireless connection to instruct the wireless device to perform an operation.

There is also provided a computer program comprising instructions which, when executed on at least one processor, cause the at least one processor to carry out the method as described above.

There is also provided a computer program product comprising a computer-readable medium with the computer program described above.

The aforementioned embodiments allow for communication between an unmanned vehicle and a wireless device which may have lost the ability to communicate with a wireless communications network.

BRIEF DESCRIPTION OF THE DRAWINGS

For a better understanding of the present invention, and to show how it may be put into effect, reference will now be made, by way of example only, to the accompanying drawings, in which.

DESCRIPTION

Figure 1:
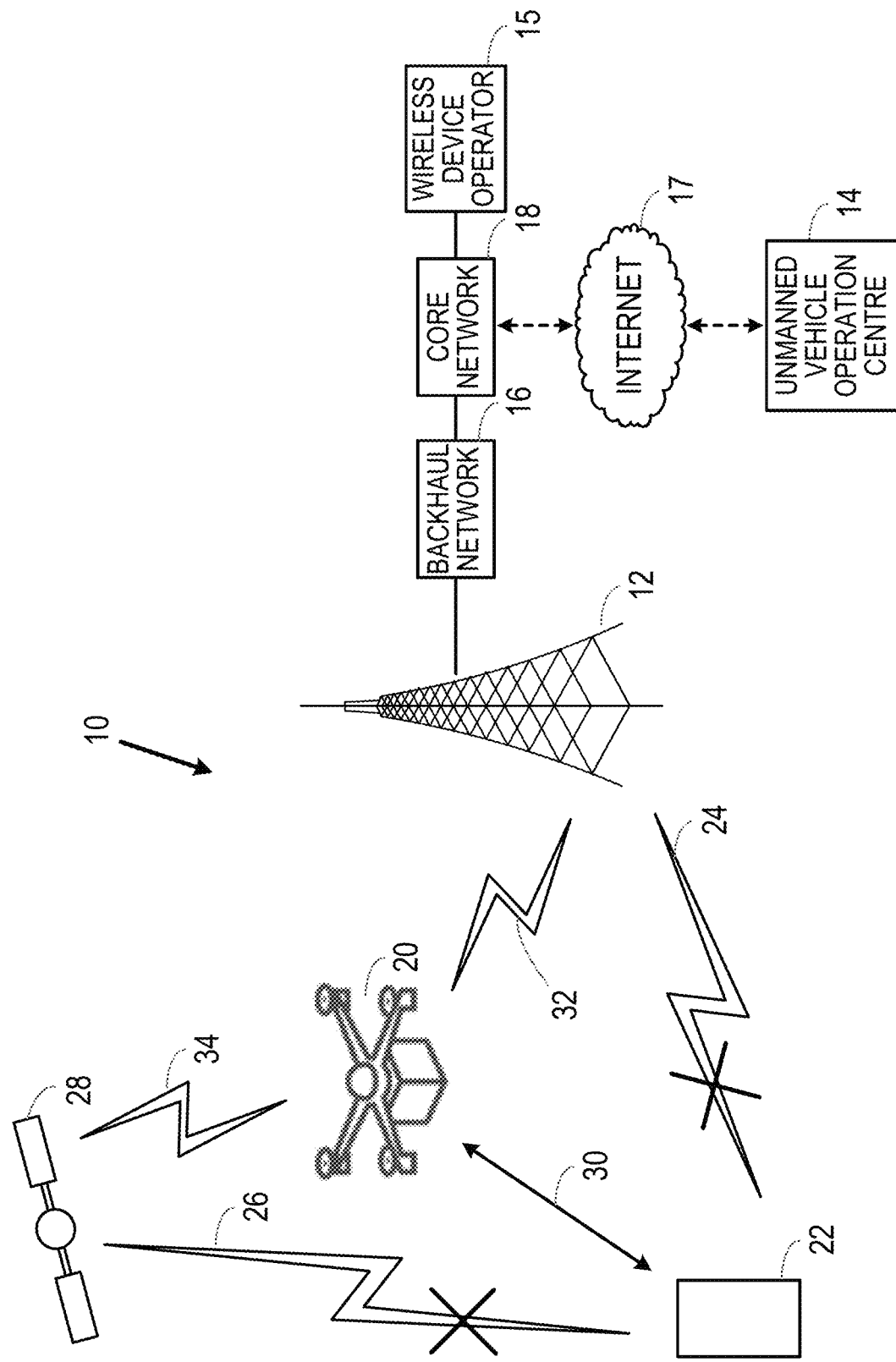
FIG. 1 illustrates a communications network according to embodiments disclosed herein.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless device, or user equipment (UE), it should be understood by the skilled in the art that "UE" is a non-limiting term comprising any mobile or wireless terminal, device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

Embodiments described herein provide methods and apparatus for providing communication with a wireless device by establishing a device-to-device D2D communication between the wireless device and an unmanned vehicle, which has located the wireless device.

The present embodiments focus on two main possibilities where establishing a device-to-device connection between a wireless device and an unmanned vehicle may be used. Firstly, if a wireless functionality of the wireless device has failed, for example a positioning system signal or data connection is lost. Secondly, if a wireless device is incapable of communication with a wireless communications network. For example, the wireless device may be located in a no coverage zone, or may not be provided with the functionality required to establish a wireless connection to a wireless communications network.

FIG. 1 illustrates an example of wireless communications network 10 that may be utilized to explain the principles of embodiments of the present disclosure. The wireless communications network 10 comprises a base station 12 which is connected via a backhaul network 16 to a core network 18.

The base station 12 may be referred to as e.g. a radio access node, a NodeB, an evolved NodeB (eNB, or eNodeB), gNodeB, a base transceiver station, an Access Point Base Station, a base station router, a Radio Base Station (RBSs), a macro base station, a micro base station, a pico base station, a femto base station, a Home eNodeB, a relay and/or repeater, a beacon device or any other network node configured for communication with wireless devices over a wireless interface, depending e.g. on the radio access technology and terminology used.

The base station 12 is communicating with an unmanned vehicle 20. The unmanned vehicle may be for example, an Unmanned Ariel Vehicle, UAV, an Unmanned Ground Vehicle, UGV, an Unmanned Underwater Vehicle, UUV, or an Unmanned Surface Vehicle, USV. In this example, the unmanned vehicle 20 is a UAV or drone. The unmanned vehicle 20 (also referred to as a wireless device or drone) is in wireless communication with the base station 12. For example, unmanned vehicle 20 may be camped on a cell or beam which the base station 12 serves. Messages transmitted by the unmanned vehicle 20 to the base station 12 are said to be transmitted in the "uplink", while messages transmitted by the base station 12 to the unmanned vehicle 20 are said to be transmitted in the "downlink".

The unmanned vehicle 20 may be in communication, via the core network 18, and in some examples an internet provider 17, with an unmanned vehicle operation centre 14. For example, the owner and/or operator of the unmanned vehicle 20 may be communicating with the unmanned vehicle 20 via the wireless communications network 10 using a second data connection 32 between the unmanned vehicle 20 and the base station 12. The unmanned vehicle 20 may also be provided with a connection 34 to a positioning system which communicates via a satellite, such as satellite 28.

A wireless device 22 may be located within a geographical area served by the first base station 12. However, as described previously, a wireless functionality of the wireless device may have failed, for example a positioning system signal or data connection is lost. For example, the wireless device 22 may have had a data connection 24 to the base station 12 which has failed. Alternatively, or additionally, the wireless device 22 may have had a positioning system connection 26 to a satellite 28 which has failed. The failure of these wireless functionalities may be due to any reason, as would be appreciated by a person skilled in the art. For example, a Subscriber Identity Module (SIM) associated with the unmanned device may be broken or functioning incorrectly.

In some examples, the wireless device 22 may be located outside of an area served by the base station 12 and may therefore be unable to communicate data to a wireless device operator 15 using the wireless communications network. In some examples, the wireless device 22 may not be provided with a data connection capability and may therefore be unable to communicate with the wireless device operator 15.

The wireless device 22 may be for example, an unmanned vehicle. For example, the wireless device 22 may comprise an Unmanned Ariel Vehicle, UAV, an Unmanned Ground Vehicle, UGV, an Unmanned Underwater Vehicle, UUV, or an Unmanned Surface Vehicle, USV. In this example, the unmanned vehicle 20 is a UAV or drone. In other embodiments, the wireless device 22 may comprise any unmanned wireless device, for example a wireless sensor.

In embodiments described herein the unmanned vehicle 20 may be configured to establish device-to-device connection 30 with the wireless device 22.

Figure 2:
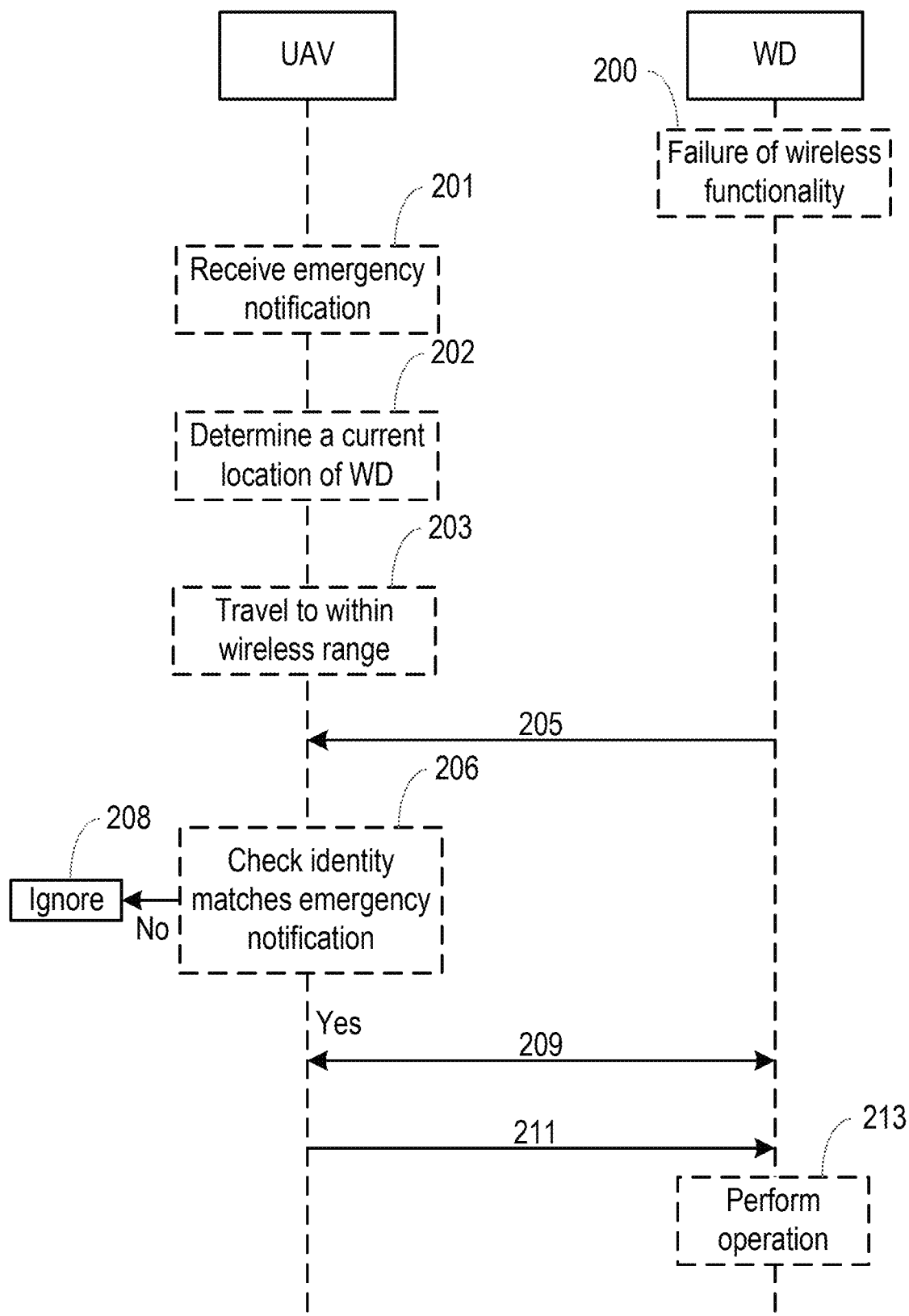
FIG. 2 illustrates a signalling diagram illustrating an example of a method performed by an unmanned vehicle and a wireless device according to some embodiments.

FIG. 2 is a signalling diagram illustrating an example of a method performed by an unmanned vehicle and a wireless device according to some embodiments. The unmanned vehicle may be the unmanned vehicle 20 illustrated in FIG. 1, and the wireless device may be the wireless device 22 illustrated in FIG. 1.

In some embodiments the method occurs responsive to a failure of a wireless functionality of the wireless device 22 in step 200. For example, if the wireless device 22 stops reporting its location to an operator 15 of the wireless device 22, or stops communicating altogether with the operator 15 of the wireless device 22 this may indicate that a wireless functionality associated with the wireless device 22 has failed.

In other examples, the method may occur responsive to a need to upgrade or collect data from the wireless device 22 which may be incapable of performing such actions by using the wireless communications network. For example, the method may occur responsive to an upgrade requirement of the wireless device 22, or may occur periodically to collect data from the wireless device 22.

In some examples, in step 201 the unmanned vehicle 20 receives an emergency notification relating to the wireless device 22. In some examples, the unmanned vehicle 20 is already deployed by an unmanned vehicle operation centre 14 and "patrolling" ready for such notifications. In other examples, the unmanned vehicle 20 may receive the emergency notification on start-up. For example, the unmanned vehicle operation centre 14 may select the unmanned vehicle 20 to perform a particular operation associated with the emergency notification. The emergency notification may in some embodiments be transmitted by the unmanned vehicle operation centre 14 to the unmanned vehicle 20. In some embodiments, the unmanned vehicle 20 is selected or equipped based on the emergency notification.

In some examples, the emergency notification comprises an identity of the wireless device 22. In some embodiments the emergency notification may further comprise information regarding a last known location or current location of the wireless device 22.

In step 202 the unmanned vehicle 20 determines a current location of the wireless device 22. For example, the unmanned vehicle 20 may have been instructed to establish a D2D connection 30 with a wireless device 22 which is not capable of communicating with the wireless communications network. Alternatively, the unmanned vehicle 20 may have been instructed to establish a D2D connection 30 with a wireless device 22 which has lost some wireless functionality and is therefore either no longer able to communicate with the wireless communications network, or no longer aware of its own location.

The unmanned vehicle 20 may then, in step 203, travel to within a wireless range of the current location of the wireless device 22. For example, the wireless device 22 and unmanned vehicle 20 may be configured to communicate using a short range wireless technology, for example Bluetooth, ZigBee or Impulse Radio Ultra Wide Band. The wireless range of the wireless device may be the distance to which the wireless device is capable of communicating using device-to-device communication. In some example embodiments, the unmanned vehicle 20 may receive a broadcast from the wireless device 22 in step 205, indicating that the unmanned device 20 is within the wireless range of the wireless device 22. The broadcast 205 may comprise information relating to an identity of the wireless device 22. In some examples, the broadcast comprises information relating to the current location of the wireless device 22. The wireless device 22 may be configured to periodically or continuously transmit broadcasts. In some examples, the wireless device 22 may be configured to transmit broadcasts in response to a failure of a wireless functionality associated with the wireless device 22.

The unmanned vehicle 20 may check, in step 206, that the broadcasted identity of the wireless device 22 in step 205 is the same as the identity specified in the emergency notification of step 201. If the identities are not the same, the method may pass to step 208 in which the unmanned vehicle 20 ignores the broadcast and does not initiate a D2D connection 30 with the wireless device 22. However, if the broadcasted identity and the identity in the emergency notification are the same, the unmanned vehicle 20 and the wireless device 22 may establish a D2D connection in step 209. The D2D 30 connection may be established by either the wireless device 22 or the unmanned vehicle 20 transmitting a connection request to the other of the wireless device 22 and the unmanned vehicle 20. The wireless device 22 or unmanned vehicle 20 may then may accept the connection request to establish the D2D connection between the wireless device 22 and the unmanned vehicle 20.

In some examples, the D2D connection 30 may be further secured using a pin code or certificate provided by a manufacturer or operator of the wireless device 22. This pin code may be transmitted to the unmanned vehicle 20 along with the emergency notification.

In step 211, the unmanned vehicle 20 transmits an operation command to the wireless device 22 over the D2D wireless connection 30 to instruct the wireless device 22 to perform an operation. In some examples, the operation command may instruct the wireless device 22 to install upgraded software.

In some embodiments the operation command may instruct the wireless device 22 to transmit collected data to the unmanned vehicle 20. In other words, in some embodiments, the wireless device 22 collects data from a sensor or meter associated with the wireless device 22. The operation, in this example, may comprise transmitting the collected data to the unmanned vehicle 20 over the D2D connection 30. The unmanned vehicle 20 may be configured to report this collected data back to a data analysing service associated with the wireless device 22 using the wireless communications network, or may store the collected data on an on-board or cloud based memory associated with the unmanned vehicle 22. The data analysing service may in some embodiments be provided by the operator of the wireless device.

In some embodiments, for example, when a wireless functionality associated with the wireless device 22 has failed, the operation command may instruct the wireless device 22 to perform an operation to re-establish the wireless functionality.

In step 213, the wireless device 22 may then perform the operation in response to receiving the operation command from the unmanned vehicle.

In particular, embodiments disclosed herein may be used in circumstances where the wireless device 22 comprises an unmanned vehicle which has lost a wireless functionality. For example, a data connection 24 between the wireless device 22 and the wireless communications network may have failed. Alternatively or additionally, a positioning system (e.g. Global Positioning System) of the wireless device may have failed, for example a connection 26 to a satellite 28 may have failed. In these circumstances the wireless device 22 may be effectively lost. The unmanned vehicle 20 may therefore be deployed in order to at least locate the lost wireless device 22. The location of the wireless device may either result in the recovery of the wireless functionality, or if this is not possible remotely, the unmanned vehicle may tow or guide the wireless device to a desired location.

In these examples and other similar scenarios, the current location of the wireless device may be unknown, either to the wireless device 22 itself due to a failed positioning system, or because the wireless device 22 is unable to report its location using the wireless communications network, due to a failed data connection 24. In these examples, step 201 of FIG. 1 may comprise the unmanned vehicle 20 first travelling to a last known location of the wireless device 22. For example, the operator 14 of the unmanned vehicle 20 may transmit a control signal to the unmanned vehicle 20 indicating a last reported location of the wireless device 22. Alternatively, the last known location of the wireless device 22 may be reported in the emergency notification, or may be reported by a drone tracking system in a third party UAV Traffic Management (UTM) (for example, a mobile positioning system may be used if a modem is equipped on the wireless device).

In some examples, once the unmanned vehicle 20 reaches the last known location of the wireless device 22, the unmanned vehicle 20 may employ the use of an on-board camera to determine the current location of the wireless device 22. For example, the unmanned vehicle 20 may travel around the vicinity of the last known location of the wireless device 22 whilst transmitting video information from the camera to the unmanned vehicle operation centre 14. In other words, the unmanned vehicle 20 may obtain, upon reaching the last known location of the wireless device, video information relating to the surroundings of the unmanned vehicle 22.

An operator 14 of the unmanned vehicle 20 may then manually search the received video information to locate the wireless device 22, and may either transmit the determined location to the unmanned vehicle 20 or take control of the unmanned vehicle 20 to steer the unmanned vehicle 20 to within a wireless range of the wireless device 22. In other words, the unmanned vehicle 20 may transmit the video information to an operator 14 of the unmanned vehicle 20 such that the operator 14 is capable of determining, from the video information, a current location of the wireless device 22. It will be appreciated that some other third party or cloud based service may be used to determine the location of the wireless device 22 from the video information.

In some embodiments the unmanned vehicle 20 may be configured with an automatic video recognition module which may be operable to locate an object within a stream of video data and thereby locate the wireless device 22. In other words, the unmanned vehicle 20 may determine, from the video information, a current location of the wireless device 22.

In some embodiments, the broadcast in step 205 comprises information relating to the current location of the wireless device 22. In this example, the data connection 24 of the wireless device 22 may have failed, but the positioning system, for example a GPS, associated with the wireless device 22 may be functioning. Therefore, in this example, the unmanned device 20 may determine the current location of the wireless device from a broadcast received from the wireless device 22 which indicates the current location of the wireless device 22 as determined by the positioning system associated with the wireless device 22.

In some examples, diagnosis or troubleshooting of the wireless device 22 may be performed to determine a root cause of the failure of the wireless functionality, and/or a recommended operation to re-establish the lost wireless functionality. In these examples, the unmanned vehicle 20 may be required to receive information relating to the wireless device's 22 event history, system logs and operations logs and any further information relating to the wireless device in order to determine a root cause of the failure and recommend a recommended operation to re-establish the wireless functionality. It may therefore be required that the communication between the wireless device 22 and the unmanned vehicle 20 be authorised before such diagnosis can take place. To do this, in some embodiments, wireless device 20 and unmanned vehicle 22 exchange diagnosis certificates before the wireless device 22 transmits information relating to the wireless device 22 to the unmanned vehicle 20.

Figure 3:
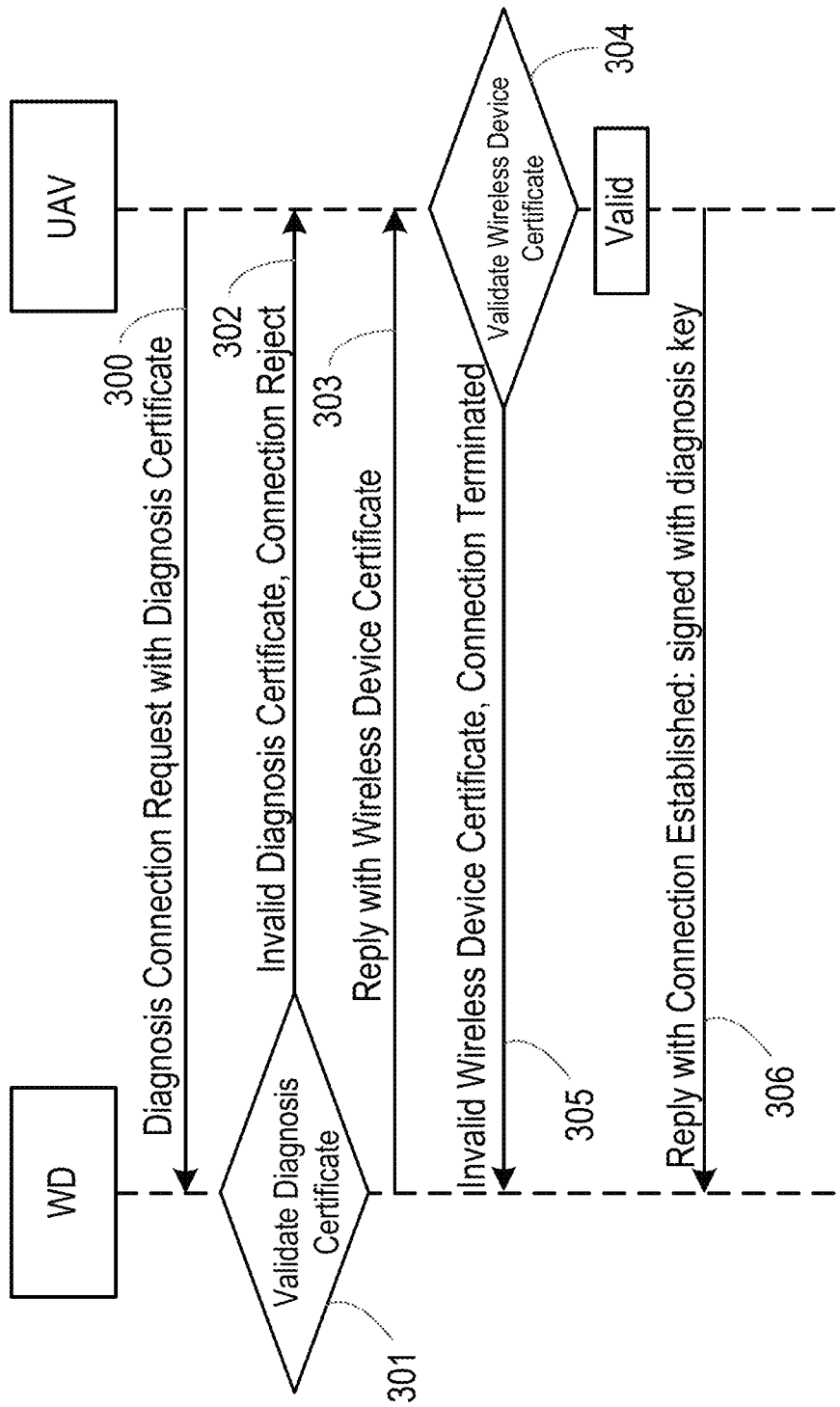
FIG. 3 illustrates an example of an authorisation method for authorising a device-to-device connection between an unmanned vehicle and a wireless device.

FIG. 3 illustrates an example of an authorisation method for authorising the D2D connection between the unmanned vehicle 20 and the wireless device 22.

In step 300 the unmanned vehicle 20 may transmit a diagnosis connection request to the wireless device 22.

The diagnosis connection request may comprise a diagnosis certificate. The diagnosis certificate may have been issued by a Certificate Authority (CA) associated with the wireless device's manufacturer/operator. The diagnosis certificate may be uploaded onto the unmanned vehicle 20, for example when the unmanned vehicle 20 is selected to perform the method of FIG. 2.

The wireless device 22 may check in step 401 whether the received diagnosis certificate is valid. For example, the wireless device 22 may check if the root CA in the diagnosis certificate is the same as an issuer of a certificate associated with the wireless device 22. The certificate associated with the wireless device may be configured on manufacture of the wireless device. The certificate of the wireless device 22 may comprise a root CA associated with the wireless device's 22 manufacturer or operator and a subject ID indicating an identity of the wireless device 22.

If the received diagnosis certificate is found to be invalid, the method passes to step 302 in which the wireless device 22 rejects the diagnosis connection request.

If the received diagnosis certificate is found to be valid, the method passes to step 303 in which the wireless device 22 transmits the certificate of the wireless device 22 to the unmanned vehicle 20.

The unmanned vehicle 20 may then check whether the certificate is valid in step 304. For example, the unmanned vehicle 20 may also check that the root CA of the certificate of the wireless device 22 is the same as the root CA of the diagnosis certificate. The unmanned vehicle 20 may also check whether the Subject ID of the certificate of the wireless device 22 matches the identity of the wireless device 22 received in the emergency notification. If the certificate is found to be invalid, the method passes to step 305 in which the unmanned vehicle 20 may terminate the D2D connection with the wireless device 22. If the certificate is found to be valid, the method passes to step 306 in which the unmanned vehicle 20 establishes the diagnosis connection.

Practically, the manufacturers of wireless devices may issue diagnosis certificates to collaborated unmanned vehicle operation centres which may install the certificates on their unmanned vehicles as and when required.

This method may therefore authorise the unmanned vehicle 20 to receive information relating to the wireless device 22. For example, the unmanned vehicle 20 may be authorised to receive information relating to the event history, system logs and operations logs etc. of the wireless device 22.

In some embodiments, for D2D communication, a superuser login name and password provided by a manufacturer of the wireless device 22 may be used for establishing a secure diagnosis connection authorizing the unmanned vehicle 20 to receive information relating to the wireless device 22.

In some embodiments therefore, the unmanned vehicle 20 may transmit a request to the wireless device 22 for the information relating to the wireless device 22, and the wireless device 22 may transmit the information relating to the wireless device 22 to the unmanned vehicle 20. The unmanned vehicle 20 may then obtain a root cause of the failure of the wireless functionality, and/or a recommended operation for re-establishing the wireless functionality, based on the information relating to the wireless device 22.

In some embodiments, to obtain the root cause of the failure of the wireless functionality, and/or the recommended operation, the unmanned vehicle 20 transmits the information relating to the wireless device 22 to a rescue centre for determining the root cause of the failure of the wireless functionality, and/or the recommended operation for re-establishing the wireless functionality. This transmission may be responsive to receiving a command to transmit the information to a rescue centre from the wireless device. The rescue centre may be deployed and maintained by the wireless device's manufacturer. Alternatively, the rescue centre may be the operator of the wireless device 22 or the operator of the unmanned vehicle 20. The rescue centre may analyze the information relating to the wireless device 22 to determine the root cause and/or recommended operation, and may transmit the root cause and/or recommended operation to the unmanned vehicle 20.

Figure 4:
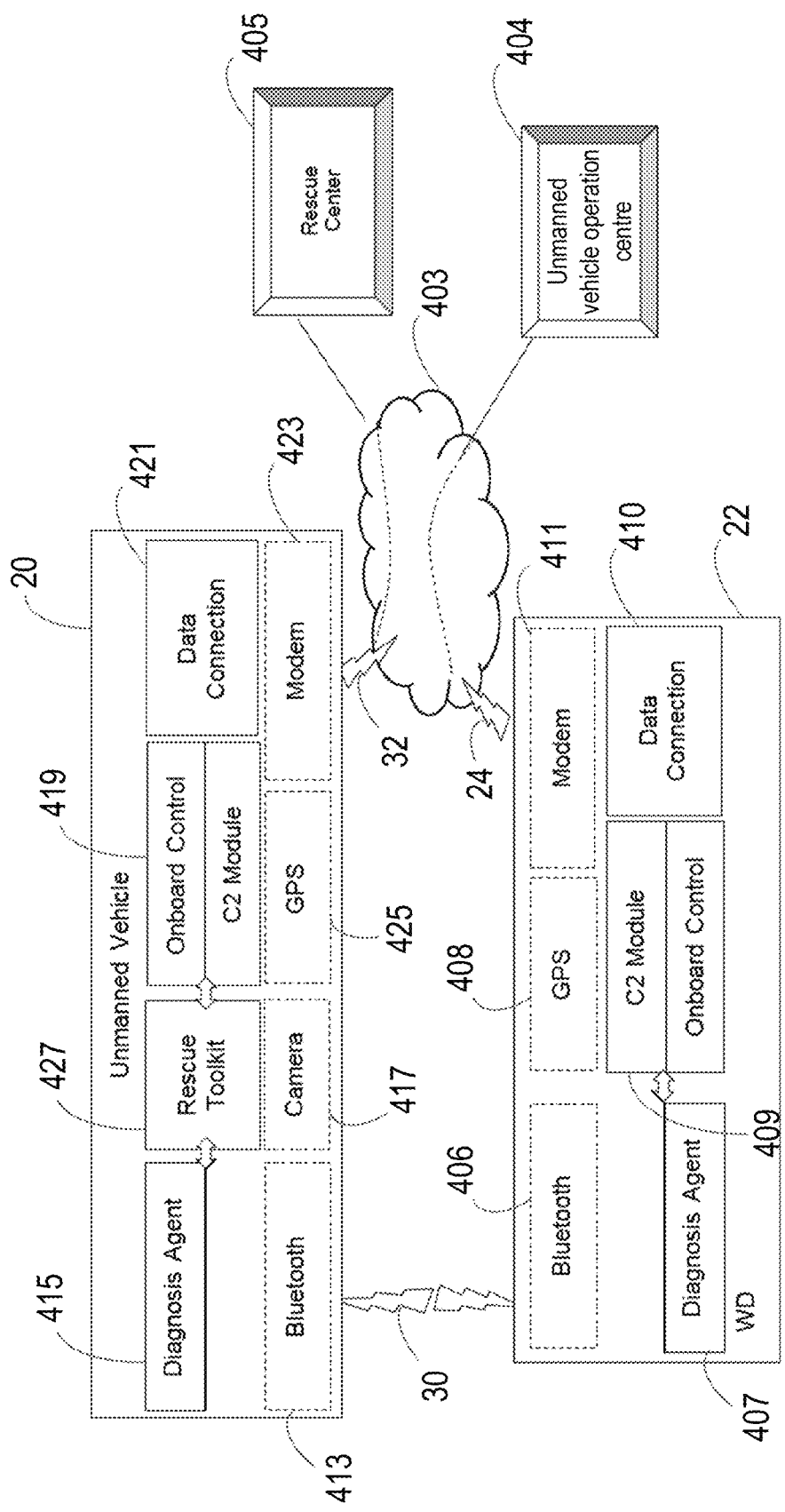
FIG. 4 illustrates a wireless device and an unmanned vehicle according to some embodiments.

In some embodiments the unmanned vehicle 20 comprises a recue toolkit as illustrated in FIG. 4. FIG. 4 illustrates a wireless device 22 and an unmanned vehicle 20 according to some embodiments. In this example, the wireless device 22 and the unmanned vehicle 20 are connected to each other using a D2D connection 30. The unmanned vehicle 20 is also connected to a wireless communications network 403. The wireless communications network 403 may link the unmanned vehicle to an unmanned vehicle operation centre 404 and a rescue centre 405.

The wireless device comprises, for example a Bluetooth interface 406. It will be appreciated that any short range wireless technology may be used. The wireless device further comprises a Diagnosis Agent 407 which may perform the method as described in FIG. 3. The wireless device 22 may further comprise a positioning module 408, for example a GPS module, which may or may not be functioning. The wireless device 22 may further comprises a command and control (C2) module 409 and an onboard control module 409 which may be accessed via the D2D connection 30. The wireless device 22 may further comprise a data connection module 410 which may provide a data connection such as data connection 24 to the wireless communications network 403 via a modem 411. Again, this data connection may or may not be functioning.

The unmanned vehicle 20 may comprises a Bluetooth interface 413. It will be appreciated that any short range wireless technology may be used. The unmanned vehicle 20 may further comprise a Diagnosis Agent 415 which may perform the method as described in FIG. 3. The unmanned vehicle 20 may comprise a camera 417 which allows the unmanned vehicle to locate the wireless device as described previously. The unmanned vehicle 20 may also comprise a C2 Module and an onboard control module 419 which control the operation of the unmanned vehicle 20. The unmanned vehicle 20 may further comprise a data connection module 421 which may provide a data connection 32 to the wireless communications network 403 via a modem 423. The unmanned vehicle 20 may also comprise a positioning system module 425 which may be used to navigate the unmanned vehicle 20.

The unmanned vehicle 20 may also comprise a rescue toolkit 427. In some embodiments, the rescue toolkit 417, provides the unmanned vehicle operation centre 404 with an operational interface, which can be remotely accessed through the unmanned vehicle's 20 data connection 32 to the wireless communications network. An operator of the unmanned vehicle 20 may then connect to the rescue toolkit 427 and log into the wireless device's system to check the system components and logs in order to troubleshoot or diagnose the emergency. In other words, the operator of the unmanned vehicle may transmit commands to the C2 module 409 of the wireless device via the D2D connection 30 between the unmanned vehicle 20 and the wireless device 22.

In some embodiments, the rescue toolkit 427 comprises a diagnostic tool which may itself log into the wireless device's 22 system to check the system components and logs in order to troubleshoot or diagnose the emergency. For example, the diagnostic tool may send commands to the C2 module 409 of the wireless device via the D2D channel. In other words the unmanned vehicle 20 may determine the root cause of the failure of the wireless functionality, and/or the recommended re-establishment operation for re-establishing the wireless functionality, based on the information relating to the wireless device 22.

In some embodiments the operation command may be based on the recommended operation. In other words, the operation command may instruct the wireless device 22 to perform the recommended operation.

As described earlier, the wireless device 22 may receive the connection request from the unmanned vehicle 20 responsive to a failure of a wireless functionality associated with the wireless device 22. In these circumstances, the step of performing the operation may comprise performing a re-establishment operation to re-establish the wireless functionality associated with the wireless device 22. Specifically the re-establishment operation may be the recommended operation determined by the rescue centre or the unmanned vehicle 20.

In some embodiments, the wireless functionality comprises a first data connection 24 between the wireless device 22 and a wireless communications network. In other words, the first data connection 24 as illustrated in FIG. 1 may have failed.

In this example, the re-establishment operation may comprise establishing a new network connection between the wireless device and the wireless communication network. For example, the new connection may comprise utilising a second data connection between the unmanned vehicle and the wireless communications network to communicate with the wireless communications network via the D2D connection. In other, words, the wireless device 22 may utilise the D2D connection 30 to connect to the unmanned vehicle 20, and the second data connection 32 between the unmanned vehicle 20 and a base station 12, to connect to the wireless communications network 10. The unmanned vehicle 20 may therefore effectively act as a relay between the wireless device 22 and the wireless communications network 10.

In some embodiments, the wireless functionality comprises a positioning system functionality, for example GPS. For example, the wireless device 22 may have lost a connection 26 to a satellite 28 as illustrated in FIG. 1.

In this example, the re-establishment operation may comprise receiving positioning information from the unmanned vehicle 20, and utilising the positioning information to determine a location of the wireless device 22. For example, the unmanned vehicle may have a functioning positioning system with a connection 34 to the satellite 28 (or a similar satellite). The unmanned vehicle 20 may therefore provide its positioning information, indicating the location of the unmanned vehicle 20, to the wireless device 22 over the D2D connection 30.

The wireless device 22 may therefore re-establish the positioning system functionality by utilising the positioning information received from the unmanned vehicle 20 to determine a location of the wireless device 22. For example, the wireless device 22 may determine a position of the wireless device 22 relative to the unmanned vehicle 20 based on signals transmitted over the D2D connection 30. For example, the received signal strength may be used to estimate the distance between the unmanned vehicle and the wireless device. The wireless device 22 may then determine the location of the wireless device 22 based on the received positioning information and the position of the wireless device relative to the unmanned vehicle 20.

In some examples, the wireless functionality may be re-established, or an attempt to re-establish the wireless functionality may be made by rebooting, resetting or reconfiguring the wireless device 22. Reconfiguring the wireless device 22 may comprise setting another mobile operator network to connect to, for example if the wireless device is utilising an embedded Subscriber Identity Module (SIM).

For example, the rescue centre 405 or unmanned vehicle 20 may determine that an error has occurred which is causing the wireless functionality to fail, and may there for recommend that the wireless device 20 be re-started in order to attempt to re-establish the wireless functionality.

Depending on the result of the operation performed by the wireless device 22, the wireless device 22 may be navigated or towed to a different location. In some embodiments, the unmanned vehicle 20 may be instructed, by the unmanned vehicle operation centre, the rescue centre or some other third party, to return the wireless device 22 to the wireless device's operator, or some other desired location where the wireless device 22 may be repaired if required.

In some examples, the unmanned vehicle 20 may tow the wireless device 22. For example, a physical gripping mechanism attached to the unmanned vehicle may be employed to physically carry the wireless device 22 to the desired location. Alternatively a magnetic mechanism may be used.

In other embodiments, where the wireless device 22 itself comprises an unmanned vehicle, the unmanned vehicle 20 may lead the wireless device to the desired location.

In other words, if the re-establishment operation fails to re-establish the positioning system functionality of the wireless device 22, the wireless device 22 may continue to use the positioning information of the unmanned vehicle 20 to determine the location of the wireless device 22. The unmanned vehicle 20 may command the wireless device 22 to follow the unmanned vehicle 20 to the desired location, with the wireless device 22 continuing to use the positioning information provided by the unmanned vehicle 20.

In these examples, if the wireless device 22 is following the unmanned vehicle 209, the distance between the wireless device 22 and the unmanned vehicle 20 may be such that the unmanned vehicle 20 is still within the wireless range of the wireless device 22. The distance between the wireless device 22 and the unmanned vehicle 20 may however, be large enough to prevent any unwanted interference between the motion of the unmanned vehicle 20 and the wireless device 22.

In another example, if the re-establishment operation fails to re-establish the wireless functionality of the wireless device 22, the unmanned vehicle 20 may provide the wireless device 22 with a new connection to the wireless communications network via the second data connection between the unmanned vehicle 20 and the wireless communications network. This allows an operator of the wireless device 22 to remotely control the wireless device 22 to navigate the wireless device to a desired location.

In some examples, the wireless device 22 may be experiencing failures due to a loss in battery power. In these embodiments, the unmanned vehicle 20 may be provided with a charging module operable to provide power to the wireless device 22. This may either be a physically charging connection or a wireless charging connection.

In some embodiments, the wireless device 22 may crash before the unmanned vehicle 20 can locate the wireless device 22. However, it may still be valuable to send an unmanned vehicle 20 to locate the wireless device 22 as it may provide better awareness of the root cause of the failure and may enable timely notification to enable better emergency handling. The unmanned vehicle 20 may locate the wireless device 22 and may transmit image, audio and/or video information of the remote scene to the wireless device operator, the unmanned vehicle operation centre and/or any Public Safety agencies. In some examples, the wireless device 22 may be equipped with a 'black-box' (i.e. Flight Recorder) with a beacon feature. In the examples, the unmanned vehicle 20 may locate the "black box" and take it back to either the wireless device operator or another operator for any further emergency and crash analysis.

In some embodiments the unmanned vehicle 20 may be specifically selected and/or equipped based on the emergency notification. For example, on receiving an emergency notification (including the wireless device's identity and/or a last reported location etc.), the unmanned vehicle 20 may be selected and equipped according to the emergency situation and the wireless device's 22 equipage and capabilities.

For example, a rescue management system may recommend the available unmanned vehicle(s) by cross-checking all the data received about the wireless device in the emergency notification with a drone registration system, for example a service in UTM (UAV Traffic Management). For example, if a wireless device 22 is equipped with a device-to-device (D2D) communication module, the certificates and configuration for D2D communication may be automatically uploaded onto the selected unmanned vehicle. The diagnostic tool provided by the wireless device's manufacturer may be installed on the unmanned vehicle 20 as well.

In some examples, the unmanned vehicle 20 may be equipped further with a recognition module which may be operable to process images captured by the camera in real-time and identify objects within the images. For example a pre-taken or factory image of the wireless device 22 may be uploaded into and/or accessible for the unmanned vehicle, in order to locate the wireless device. The recognition module may either be an onboard processing unit or may utilize corresponding cloud service through a network connection.

Figure 5:
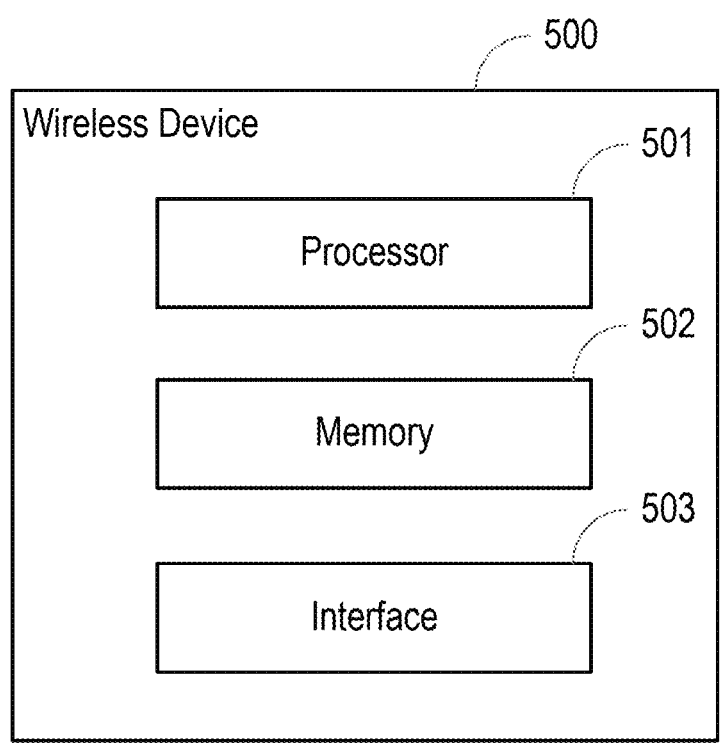
FIG. 5 illustrates a wireless device according to some embodiments.

FIG. 5 illustrates a wireless device 500 according to some embodiments. The wireless device 500 comprises an interface 503; a processor 501, and a memory 502. The processor is operable to establish a device-to-device, D2D, wireless connection to the unmanned vehicle; and responsive to receiving an operation command over the D2D wireless connection, perform an operation. It will be appreciated that the processor may be operable to perform a method as described in any of the above embodiments.

Figure 6:
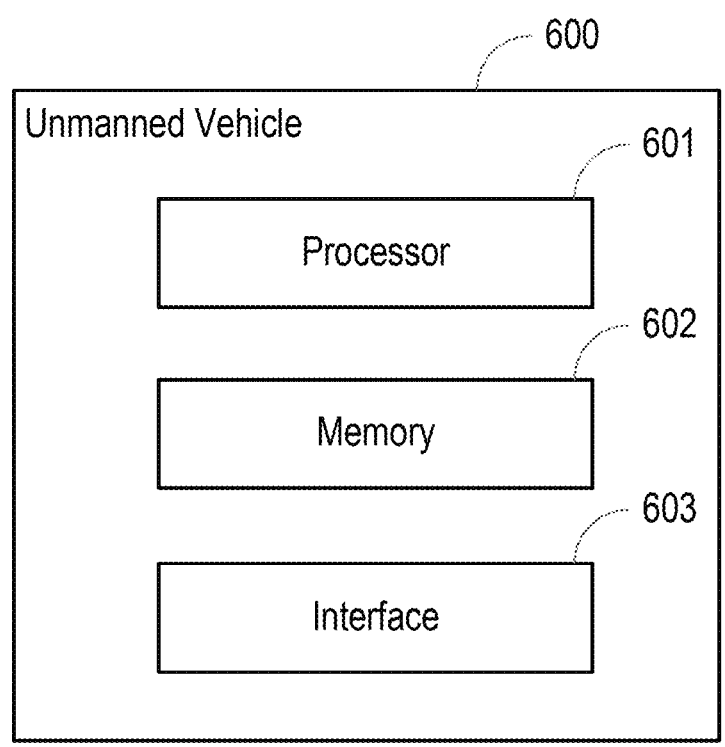
FIG. 6 illustrates an unmanned vehicle according to some embodiments.

FIG. 6 illustrates an unmanned vehicle 600 according to some embodiments. The unmanned vehicle 600 comprises an interface 603, a processor 601 and a memory 602. The processor may be operable to determine a current location of a wireless device; cause the unmanned vehicle to travel to within a wireless range of the current location of the wireless device; establish a device-to-device, D2D, wireless connection with the wireless device; and transmit an operation command to the wireless device over the D2D wireless connection to instruct the wireless device to perform an operation. It will be appreciated that the processor may be operable to cause the unmanned vehicle to perform the method as described in any of the above embodiments.

It will be appreciated that the term user equipment, UE, used below may refer to a wireless device or unmanned vehicle, and does not require there to be communication between the wireless device or unmanned vehicle and a user.

Figure 7:
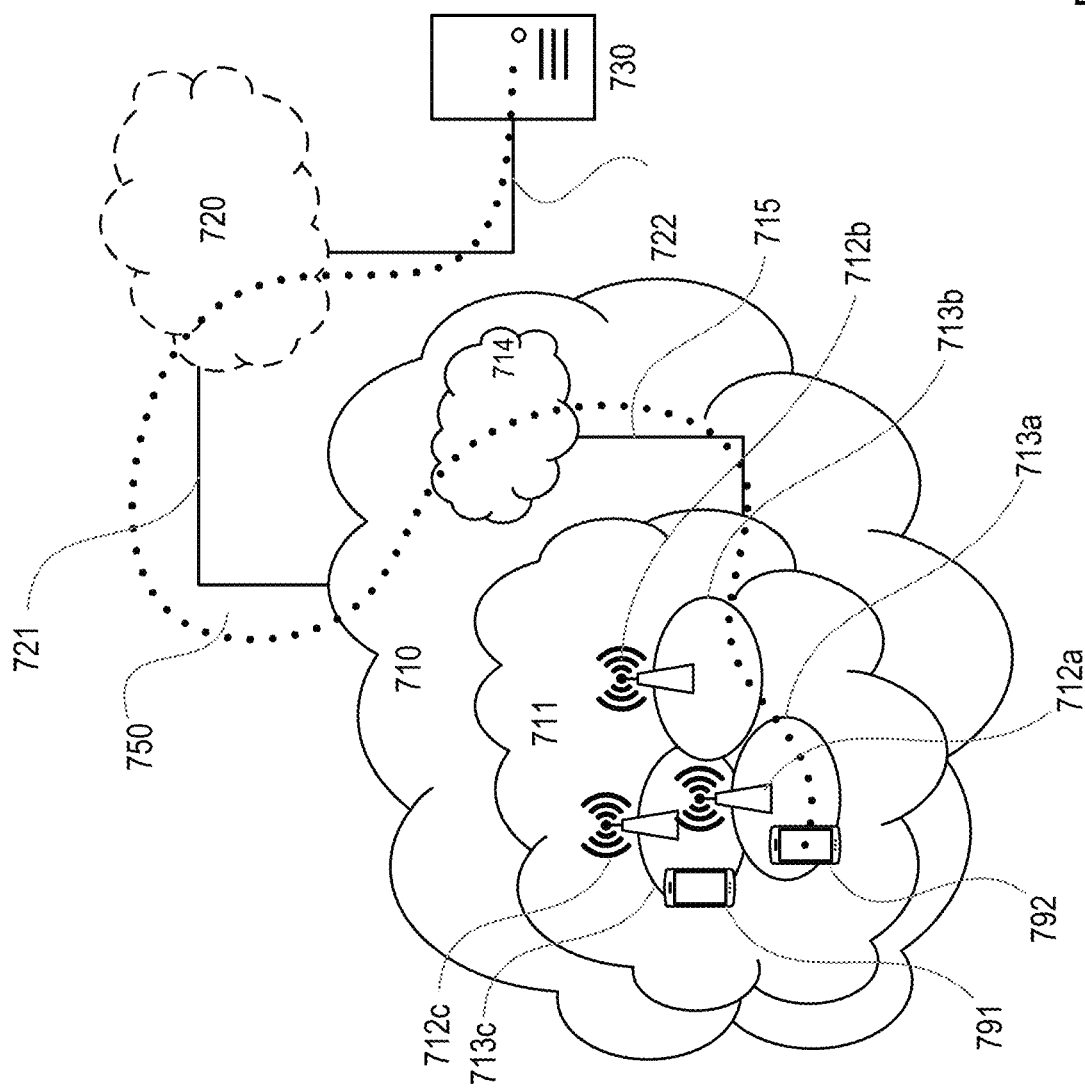
FIG. 7 illustrates a telecommunication network connected via an intermediate network to a host computer in accordance with some embodiments.

FIG. 7 illustrates a telecommunication network connected via an intermediate network to a host computer in accordance with some embodiments. With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. For example, the first UE 791 may be a wireless device 22 and base station 712c may be base station 12 as illustrated in FIG. 1. Therefore, as illustrated in FIG. 1, whilst the first UE may 791 may be configured to wirelessly connect to the corresponding base station 712c, this wireless functionality may or may not be functioning. A second UE 792 in coverage area 713a is wirelessly connected to the corresponding base station 712a. For example, the second UE may be unmanned vehicle 20 and the base station 712a may also be base station 12. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
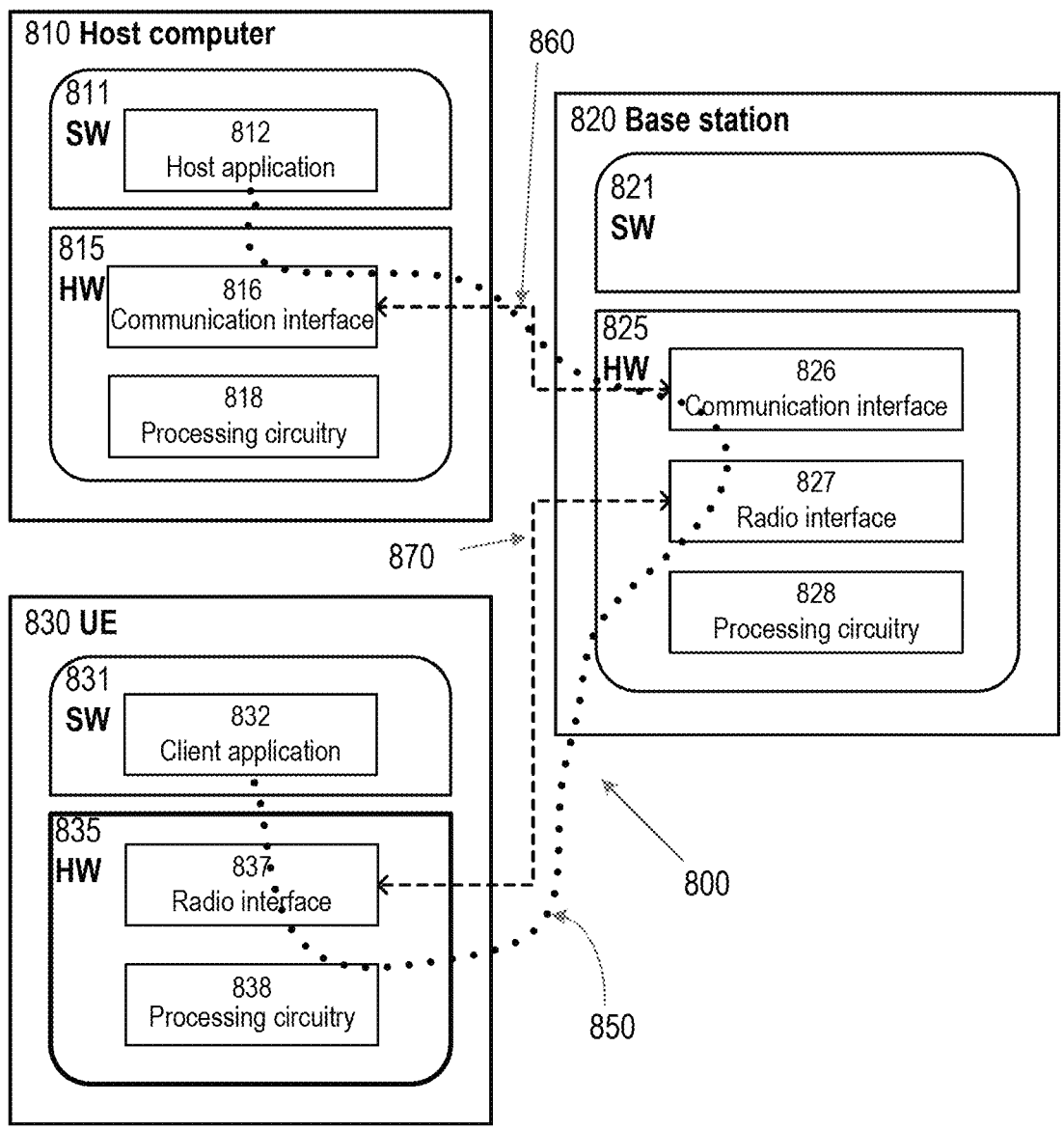
FIG. 8 illustrates a host computer communicating via a base station with a user equipment over a partially wireless connection in accordance with some embodiments.

FIG. 8 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. The UE 830 may be for example an unmanned vehicle such as unmanned vehicle 20 illustrated in FIG. 1. In providing the service to the remote user, host application 812 may provide user data which is transmitted using OTT connection 850. For example, the host computer 810 may act as a rescue centre as described above. The host computer may therefore determine a root cause and/or a recommended operation for re-establishing a wireless functionality of the wireless device which is communicating via a D2D connection to the UE 830, which may for example be unmanned vehicle 22. This may be provided via a D2D connection to an unmanned vehicle 20.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may allow wireless devices which are unable to connect to the wireless communications network to connect via a D2D connection to an unmanned vehicle. In embodiments where the wireless device comprises a lost unmanned vehicle, this may allow the wireless device to be rescued or recovered.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
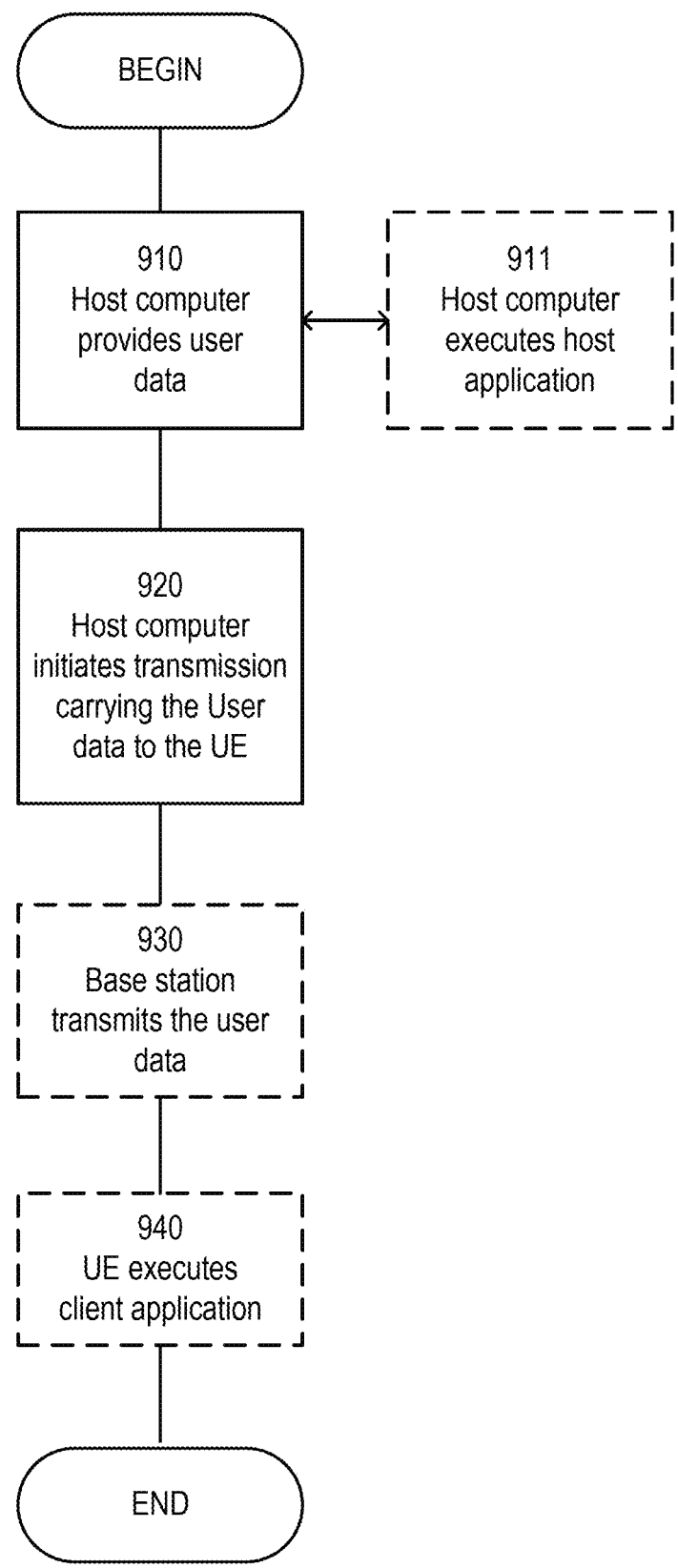
FIG. 9 illustrates a flowchart illustrating a method implemented in a communication system, in accordance with one embodiment.

FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
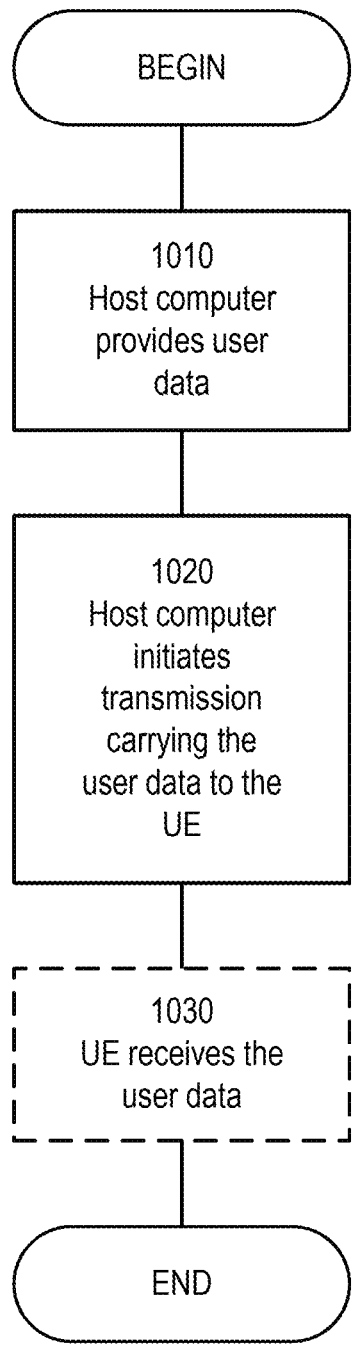
FIG. 10 illustrates methods implemented in a communication system including a host computer, a base station and a user equipment in accordance with some embodiments, which may be those described with reference to FIGS. 7 and 8.

FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
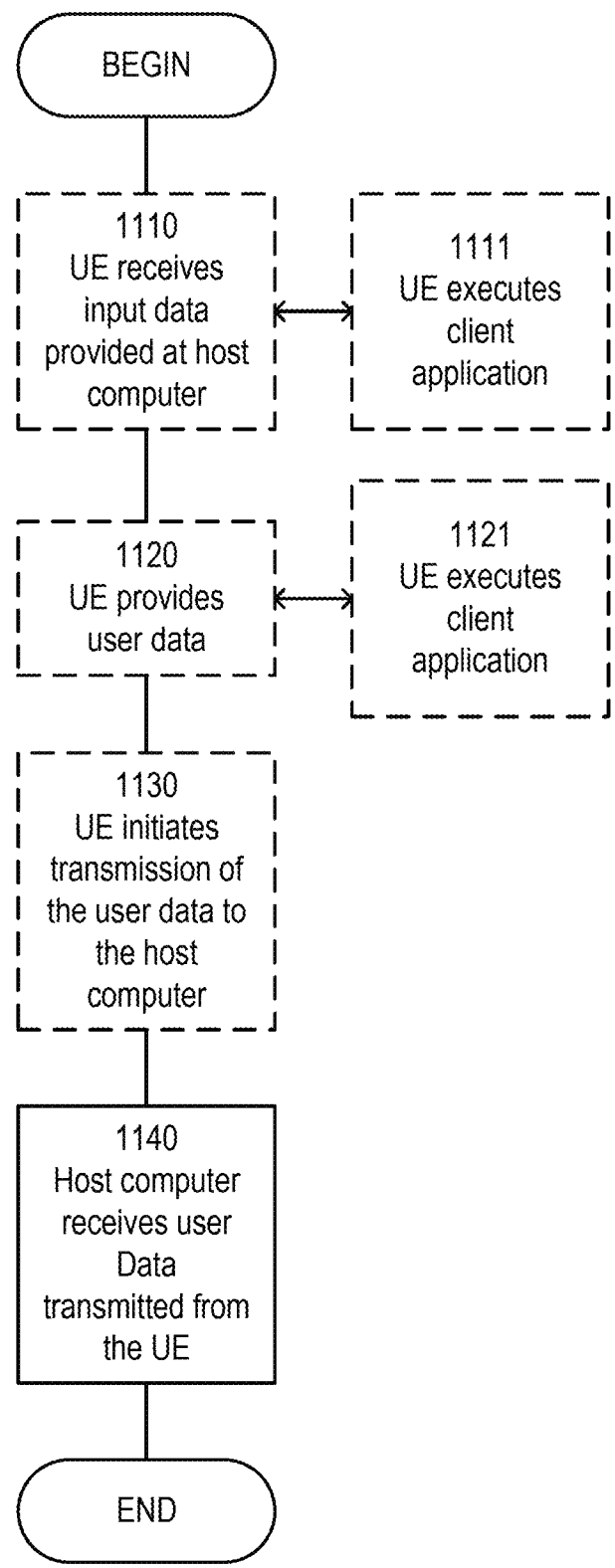
FIG. 11 illustrates a flowchart illustrating a method implemented in a communication system, in accordance with some embodiments.

FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
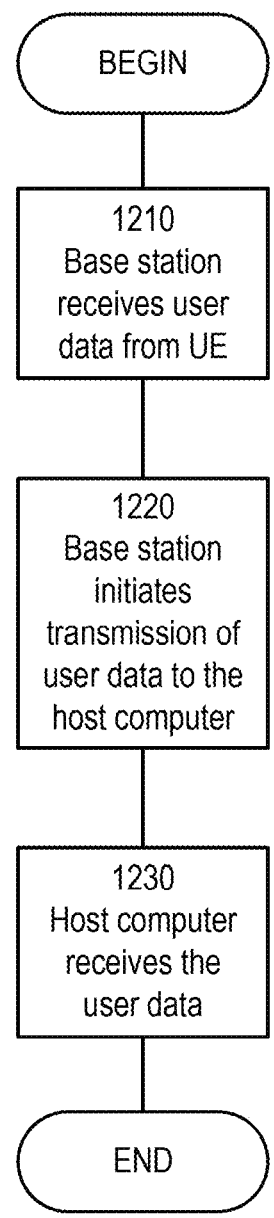
FIG. 12 illustrates methods implemented in a communication system including a host computer, a base station and a user equipment in accordance with some embodiments.

FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units.

These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

There is therefore provided a wireless device capable of establishing a device-to device connection with an unmanned vehicle in order to perform an operation it may otherwise be incapable of performing. In some embodiments, the wireless device may comprise an unmanned vehicle. There is also provided an unmanned vehicle which is operable to locate such a wireless device, establish a device-to-device communication with the wireless device in order to enable the wireless device to perform said operation.

The invention claimed is:

1. A method, in a first unmanned vehicle, the method comprising:
   transmitting or receiving using a wireless functionality associated with the first unmanned vehicle;
   establishing a device-to-device, D2D, wireless connection to a second unmanned vehicle
   responsive to a failure of the wireless functionality associated with the first unmanned vehicle, the failure of the wireless functionality comprising at least one of failure of a wireless data connection of the first unmanned vehicle and failure of a positioning system connection of the first unmanned vehicle; and
   responsive to receiving an operation command over the D2D wireless connection, performing an operation, wherein
   the step of performing the operation comprises performing a re-establishment operation to re-establish the wireless functionality associated with the first unmanned vehicle.

2. The method as claimed in claim 1 wherein the wireless functionality comprises a first data connection between the first unmanned vehicle and a wireless communications network.

3. The method as claimed in claim 2 wherein the step of performing a re-establishment operation to re-establish the wireless functionality associated with the first unmanned vehicle comprises establishing a new network connection between the first unmanned vehicle and the wireless communication network.

4. The method as claimed in claim 3 wherein the step of establishing the new network connection comprises utilizing a second data connection between the second unmanned vehicle and the wireless communications network to communicate with the wireless communications network via the D2D connection.

5. The method as claimed in claim 1 wherein the wireless functionality comprises a positioning system functionality.

6. The method as claimed in claim 5 wherein the step of performing a re-establishment operation to re-establish the wireless functionality associated with the first unmanned vehicle comprises
receiving positioning information from the second unmanned vehicle, and utilizing the positioning information to determine a location of the first unmanned vehicle.

7. The method as claimed in claim 1 wherein the step of performing a re-establishment operation to re-establish the wireless functionality associated with the first unmanned vehicle comprises rebooting, resetting or reconfiguring the first unmanned vehicle.

8. The method as claimed in claim 1 further comprising:
responsive to establishing the D2D wireless connection:
  exchanging diagnosis certificates with the second unmanned vehicle; and
  transmitting information relating to the first unmanned vehicle to the second unmanned vehicle over the D2D wireless connection.

9. The method as claimed in claim 8 further comprising, transmitting a command to the second unmanned vehicle to transmit the information to a rescue center for determining, based on the information, a root cause of the failure of the wireless functionality and/or a recommended re-establishment operation for re-establishing the wireless functionality.

10. A first unmanned vehicle, the first unmanned vehicle comprising:
an interface; and
a processor, wherein the processor is operable to:
transmit or receive using a wireless functionality associated with the first unmanned vehicle;
establish a device-to-device, D2D, wireless connection to a second unmanned vehicle
responsive to a failure of the wireless functionality associated with the first unmanned vehicle, the failure of the wireless functionality comprising at least one failure of a wireless data connection of the first unmanned vehicle and failure of a positioning system connection of the first unmanned vehicle; and
responsive to receiving an operation command over the D2D wireless connection, perform an operation,
wherein
the processor is configured to perform the operation by performing a re-establishment operation to re-establish the wireless functionality associated with the first unmanned vehicle.

11. The wireless device as claimed in claim 10 wherein the wireless functionality comprises a first data connection between the first unmanned vehicle and a wireless communications network.

12. The wireless device as claimed in claim 11 wherein the processor is configured to perform a re-establishment operation to re-establish the wireless functionality associated with the first unmanned vehicle by establishing a new network connection between the first unmanned and the wireless communication network.

13. The wireless device as claimed in claim 12 wherein the processor is configured to establish the new network connection by utilizing a second data connection between the second unmanned vehicle and the wireless communications network to communicate with the wireless communications network via the D2D connection.

14. The wireless device as claimed in claim 10 wherein the wireless functionality comprises a positioning system functionality.

15. The wireless device as claimed in claim 14 wherein the processor is configured to perform a re-establishment operation to re-establish the wireless functionality associated with the first unmanned vehicle by receiving positioning information from the second unmanned vehicle, and utilizing the positioning information to determine a location of the first unmanned vehicle.

16. The wireless device as claimed in claim 10 wherein the processor is configured to perform a re-establishment operation to re-establish the wireless functionality associated with the first unmanned vehicle by rebooting, resetting or reconfiguring the first unmanned vehicle.

17. The wireless device as claimed in claim 10 wherein the processor is further configured to, responsive to establishing the D2D wireless connection:
exchange diagnosis certificates with the second unmanned vehicle; and
transmit information relating to the first unmanned vehicle to the unmanned vehicle over the D2D wireless connection.

18. The wireless device as claimed in claim 17 wherein the processor is further configured to transmit a command to the second unmanned vehicle to transmit the information to a rescue center for determining, based on the information, a root cause of the failure of the wireless functionality and/or a recommended re-establishment operation for re-establishing the wireless functionality.

19. A computer program product comprising a non-transitory computer-readable medium that stores a program comprising instructions, which, when executed on at least one processor, controls a first unmanned vehicle by causing the at least one processor to:
transmit or receive using a wireless functionality associated with the first unmanned vehicle;
establish a device-to-device, D2D, wireless connection to a second unmanned vehicle;
responsive to a failure of the wireless functionality associated with the first unmanned vehicle, the failure of the wireless functionality comprising at least one of failure of a wireless data connection of the first unmanned vehicle and failure of a positioning system connection of the first unmanned vehicle; and
responsive to receiving an operation command over the D2D wireless connection, perform an operation;
establish the device-to-device connection to the unmanned vehicle responsive to a failure of a wireless functionality associated with the wireless device, wherein the performing of the operation comprises performing a re-establishment operation to re-establish the wireless functionality associated with the first unmanned vehicle.

* * * * *